United States Patent [19]
Ito et al.

[11] 4,194,819
[45] Mar. 25, 1980

[54] DEVICE FOR CONFIRMING THE DEPTH OF FOCUS OF A CAMERA

[75] Inventors: Fumio Ito, Yokohama; Masayuki Suzuki, Kawasaki; Hiroyashu Murakami, Tokyo; Nobuaki Date, Kawasaki; Tadashi Ito, Yokohama; Akio Sunouchi, Tokyo, all of Japan

[73] Assignee: Canon Kabushiki Kaisha, Tokyo, Japan

[21] Appl. No.: 946,167

[22] Filed: Sep. 27, 1978

Related U.S. Application Data

[63] Continuation of Ser. No. 791,001, Apr. 26, 1977, abandoned.

[30] Foreign Application Priority Data

Apr. 28, 1976 [JP] Japan .................................. 51-49108

[51] Int. Cl.² ............................ G03B 7/08; G03B 9/02
[52] U.S. Cl. .......................................... 354/43; 354/46; 354/271; 354/272
[58] Field of Search ........................ 354/29, 30, 38, 40, 354/43, 46, 47, 232, 266, 267, 270, 271, 272

[56] References Cited

U.S. PATENT DOCUMENTS

| | | | |
|---|---|---|---|
| 3,900,856 | 8/1975 | Taguchi et al. | 354/46 X |
| 3,906,517 | 9/1975 | Nomura et al. | 354/272 X |
| 3,988,748 | 10/1976 | Iura et al. | 354/43 X |
| 4,015,198 | 3/1977 | Iwashita et al. | 354/43 X |

Primary Examiner—Michael L. Gellner
Attorney, Agent, or Firm—Toren, McGeady and Stanger

[57] ABSTRACT

The present invention relates to a camera so designed that the aperture preset mechanism as well as the aperture adjusting mechanism at the side of the camera body are operative by means of the first urging mechanism provided in the lens barrel. The aperture adjusting mechanism is operated by means of the release operation of the camera so as to close the aperture preset mechanism down to a certain determined aperture value. Between the aperture adjusting mechanism and the aperture preset mechanism an intermediary member and the second urging mechanism are provided. By means of operating the focus depth confirmation member, the aperture preset mechanism is closed down to a certain determined aperture value through the intermediary member. The camera is brought into the state ready for taking a picture by means of the second urging mechanism upon releasing the focus depth confirmation operation.

6 Claims, 5 Drawing Figures

DEVICE FOR CONFIRMING THE DEPTH OF FOCUS OF A CAMERA

This is a continuation of application Ser. No. 791,001 filed Apr. 26, 1977, now abandoned.

BACKGROUND OF THE INVENTION

Generally, the driving of the aperture control mechanism of a camera is divided into the push method in accordance to which the aperture preset means of the lens barrel as well as the aperture adjusting means at the side of the camera body are operated by means of the urging means at the side of the camera body and the escape method in accordance to which the aperture preset means as well as the aperture adjusting means are operated by means of the urging means of the lens barrel. In the case of the push method, an urging means whose urging strength is larger than that of the aperture preset means of the lens barrel is provided so that the depth of focus can easily be confirmed while the camera becomes unavoidably large and the winding up operation becomes heavy. This is clearly undesirable. On the other hand, in the case of the escape method, by means of the urging strength of the lens barrel, the aperture preset means as well as the aperture adjusting means are operated so that the winding up power is not necessary and, while a compact camera can be realized, the depth of focus can not always be confirmed easily. This is also undesirable.

Recently, when it is desired to design a particularly compact camera, it is very advantageous to adopt the escape system. However, in the case of the focus depth confirmation device of the camera with escape system, the aperture adjusting means is brought into operative state by means of operating the depth confirming lever and the aperture present means is closed down to a certain determined aperture value by means of the urging means at the side of the lens barrel so as to confirm the focus depth. When a picture is to be taken with a comatic exposure, it is necessary to release the focus depth confirmation lever and to charge the aperture adjusting means from the beginning so as to store the urging strength of the urging means at the side of the lens barrel. This is simply too much for the photographer.

SUMMARY OF THE INVENTION

A first purpose of the present invention is to offer a focus depth confirmation device constituted in a simple way.

Another purpose of the present invention is to offer a focus depth confirmation device so designed that by providing an intermediary member and an urging means between the aperture preset means, and the aperture adjusting means the automatic exposure mechanism resumes automatically the state ready for taking a picture after the release of the focus depth confirmation operation.

Further purposes will be disclosed from the explanation to be made below in detail in accordance with the accompanying drawings of the embodiments of the present invention.

DETAILED DESCRIPTION OF PREFERRED EMBODIMENT

Figure 1:
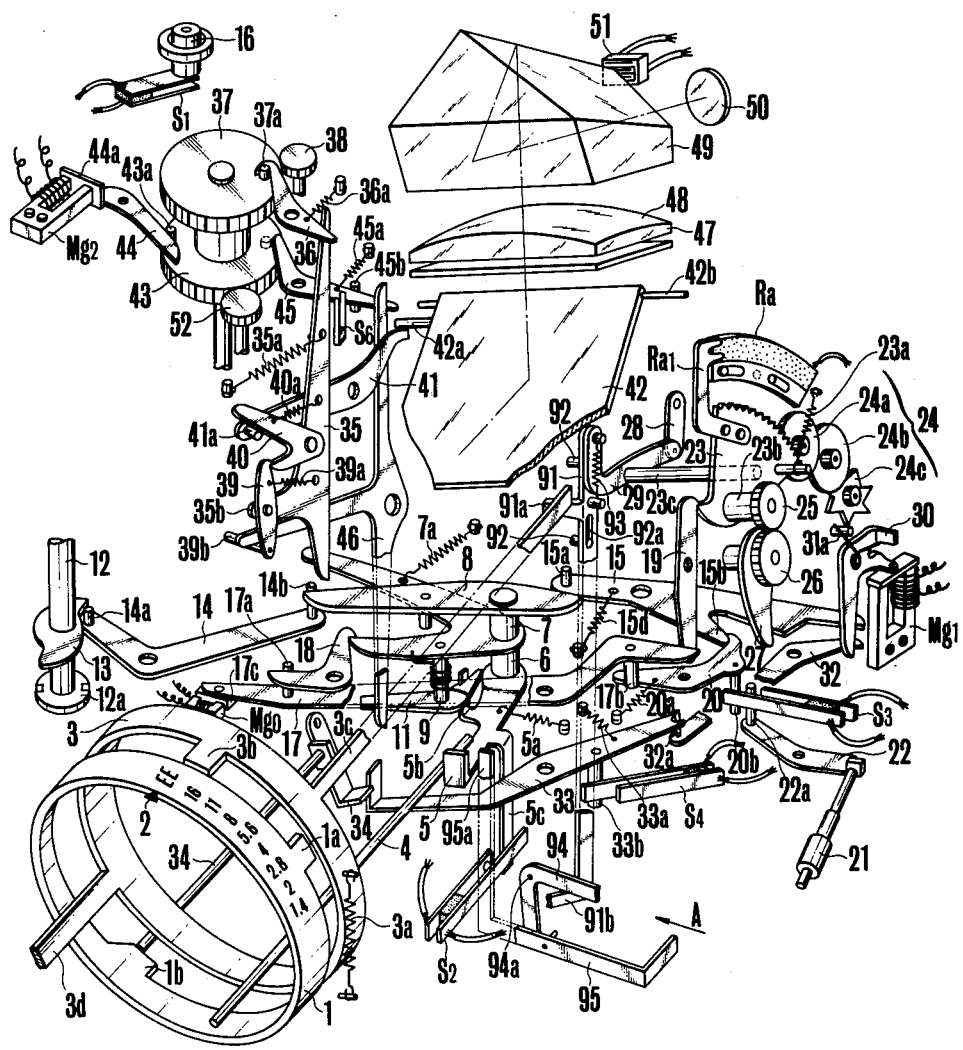
FIG. 1 shows the internal mechanism of the camera.

FIG. 1 shows the internal mechanism of the camera.
FIG. 1 shows the state in which the film has been wound up while the shutter has been charged. As shown, 1 is the aperture ring on which the automatic aperture EE index and the manual aperture index (in the drawing 1.4–16 is shown for the sake of convenience) are provided. The aperture ring is provided with the projection 1a and the cam part 1b. 2 is the index for making the automatic aperture EE index coincide with the manual aperture index. 3 is the aperture present ring, being urged along the clockwise direction by means of the spring member 3a. The projection 3b of the aperture preset ring is engageable with the projection 1a of the aperture ring 1. The aperture preset ring 3 is provided with the arm 3c and the lever part 3d. The lever part 3d determines the rotation of the bell crank (not shown in the drawing) through the aperture setting cam ring (not shown in the drawing). By means of the rotation of the bell crank, the rotation of the diaphragm driving ring (not shown in the drawing) is controlled so as to decide the opening degree of the diaphragm blades in order to determine the aperture. 4 is the pin provided on the diaphragm driving ring, whereby its end 5a is engaged with the automatic aperture lever 5.

The automatic aperture lever 5 presents a rising-up part 5b and the falling down part 5c. With the rising up part 5c, the movable contact of the hold switch $S_2$ is engaged. Further, on the automatic aperture lever 5, the second automatic aperture lever 7 (Fork-shaped) and the intermediary lever 8 are pivoted coaxially with each other. The second automatic lever 7 is urged along the clockwise direction by means of the spring member 7a, whereby the pin 9 secured in the middle of one side of the second lever 7 is pivoted on the lever 11 through the spring 10. The one end of the lever 11 is engaged with the rising-up part 5b of the automatic aperture lever 5.

12 is the winding-up shaft of the winding up lever (not shown in the drawing), on which shaft the winding up cam 13 is secured. The lower end of the winding up shaft is provided with the engaging part 12a to be engaged with the winding up shaft (not shown in the drawing) of the motor drive device. 14 is the rotatable lever, the pin 14a provided on whose one end is engaged with the winding up cam 13. The pin 14b provided on the other end of the lever 14 is engaged with the intermediary lever 8. With the other end of the intermediary lever 8, the pin 15a provided on the one end of the charge lever 15 can be engaged.

The other end of the charge lever 15 is branched (15b, 15c), being urged along the clockwise direction by means of the spring member 15d. 16 is the shutter button, whereby the switch $S_1$ (for release and EE magnet) is closed when the button 16 is depressed. 17 is the rotatable release lever, on whose one end the iron piece 17c to be attracted by the magnet $Mg_0$ (for release) is rotatably mounted. The engaging lever 18 engaged with the one side of the second automatic aperture lever 7 is held by the pin 17a provided on the release lever 17. In this manner the one end of the rotatable EE holding lever 19 is engaged with the other end of the release lever 17. Further, on the other end of the release lever 17, the pin 17b is provided, being maintained with the lever 20 to be urged along the counter clockwise direction by means of the spring member 20a. The movable contact of the switch $S_3$ (for memory holding) is maintained by the pin 20b provided on the other end of the lever 20. Further, the movable contact of the switch $S_3$ is held by the pin 22 operated by the EE lock button 21. The other end of the lever 20 is engaged with the one end 15b of the charge lever 15.

23 is the sector gear, being urged by means of the spring member 23a and held at the other end of the holding lever 19. With this sector gear 23, the gears 24a, 24b and the stop wheel 24c constituting the speed control mechanism are engaged. On the sector gear 23, the brush $Ra_1$ movable sliding over the variable resistance Ra for determining the present aperture value is mounted. Further on the shaft 23b of the sector gear 23, the gear 25 is mounted and engaged with the charge gear 26. 27 is secured coaxially with the gear 26, being in contact with the stepped part at the other end 15c of the charge lever 15.

The pin 23c is provided on the sector gear 23, while the end plane of the pin 23c is fixed on the signal lever 29 pivoted on the supporting lever 28. 91 is the slide lever, presenting a groove 92a and constituted so as to be movable upwards and downwards by means of the guide pin 92 provided on the base plate (not shown in the drawing) of the camera. The spring member 93 is provided between the slide lever 91 and the signal lever 29. By means of the strength of the spring member 93 higher than that of the spring member 23c the slide lever 91 is attracted along the direction along which the lever 91 is brought into contact with the signal lever 29.

91a is the arm part of the slide lever 91, being held with the arm 3c of the aperture preset ring. The strength of the spring member 3a is chosen larger than that of the spring member 23a. Consequently, the urging strength along the clockwise direction against the strength of the spring 23a is given to the sector gear 23 through the slide lever 91 and the signal lever 29. The other end 91b of the slide lever 91 is engaged with the lever 92 rotatable around the shaft 94a as center. 95 is the diaphragm closing lever (for confirming the depth of focus), rotating the automatic aperture lever 5 along the clockwise direction by means of the end 95a when the lever 95 is translated along the direction of the arrow A, and translating the slide lever 91 downwards through the lever 94.

$Mg_1$ is the aperture control magnet, attracting the iron piece mounted on the lever 30. The lever 30 is urged along the counter clockwise direction by means of the spring 31a, whereby the end of the lever 30 is enagageable with the stop wheel 24c of the speed control mechanism 24. Further, with the other end of the lever 30, the one end of the charge lever 15 and the one end of the clamp lever 32 (for manual operation) are in contact.

On the other end of the clamp lever 32, the pin 32a is provided, being engaged in the concave part at the one end of the lever 33. This lever 33 is urged along the counter clockwise direction by means of the spring 33a, at the same time holding the movable contact of the switch (for manual operation) by means of the mounted pin 33b. The other end of the lever 33 is held at the one end of the cantilever 34. The pin 34' is provided at the lens side, whereby the end plane of the pin 34' is in contact with the cam part 1b of the aperture ring 1. 35 is the mirror driving lever having a delay device (not shown in the drawing), being urged along the counter clockwise direction by means of the spring 35a.

The one end of the mirror driving lever 35 is held at the end of the second automatic aperture lever 7, while the other end is engaged with the one end of the front shutter plane lock lever 36. This front shutter plane lock lever 36 is urged along the counter-clockwise direction by means of the spring member 36a, whereby the front end is engaged with the pin 37a provided on the front shutter plane gear 37. This front shutter plane gear 37 is engaged with the front shutter plane pinion 38 of the front shutter plane drum (not shown in the drawing). On the projection 35b of the mirror driving lever 35, the mirror lock lever 39 is pivoted. This mirror lock lever 39 is urged along the clockwise direction by means of the spring member 39a provided between the mirror lock lever 39 and the mirror driving lever 35, being engaged with the pushing up lever 40 whose one end is pivoted on the mirror driving lever 35. The pushing up lever 40 is urged along the clockwise direction by means of the spring member 40a provided between the pushing up lever 40 and the mirror driving lever 35, whereby the other end is held at the pin 41a provided on the mirror lifting up lever 41. The other end of the mirror lifting up lever 41 holds the lifting up pin 42a provided on the mirror 42 which is rotatable around the mirror shaft 42b.

43 is the rear shutter plane gear provided coaxially with the front shutter plane gear 37 but separate from that 37, being engaged with the rear shutter plane pinion 52 for the rear shutter plane drum (not shown in the drawing). Further, on the rear shutter plane gear 43, the pin 43a is mounted. 44 is the lever to be rotated by means of the pin 43a, whereby the iron piece 44a is attracted by the shutter control magnet $Mg_2$. 45 is the rear shutter plane signal lever to be rotated by means of the pin 43a, normally rotated into and held at the position of the holding pin 45b by means of the spring 45a. $S_6$ is the rear shutter plane signal switch to be closed when the rear shutter signal lever 45 is rotated along the clockwise direction. 46 is the lever having three terminals whose first end is held by the other end of the lever 45, whose second end is held by the pin 39b provided on the mirror lock lever 39 and whose third end is held at the other end of the lever 11. In this manner, the light penetrating the photographic lens (not shown in the drawing visually recognized by the photographer at the eye piece 50 through the mirror 42, the focusing plate 47, the condenser lens 48 and the pentagonal prism 49. 51 is the light sensing element such as a blue cell.

Figure 2:
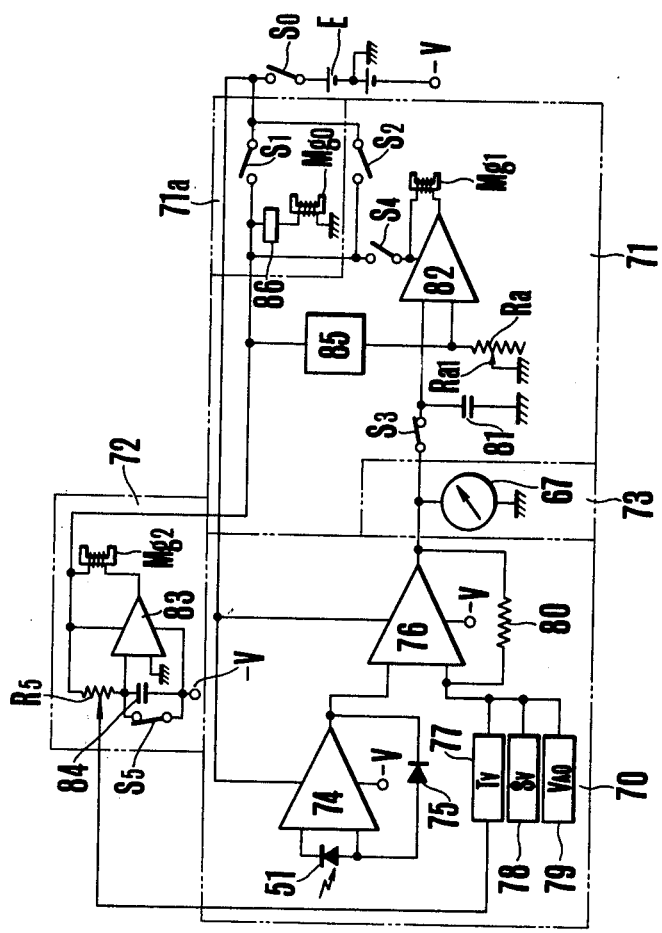
FIG. 2 shows the circuit diagram of the camera shown in FIG. 1.
Figure 4:
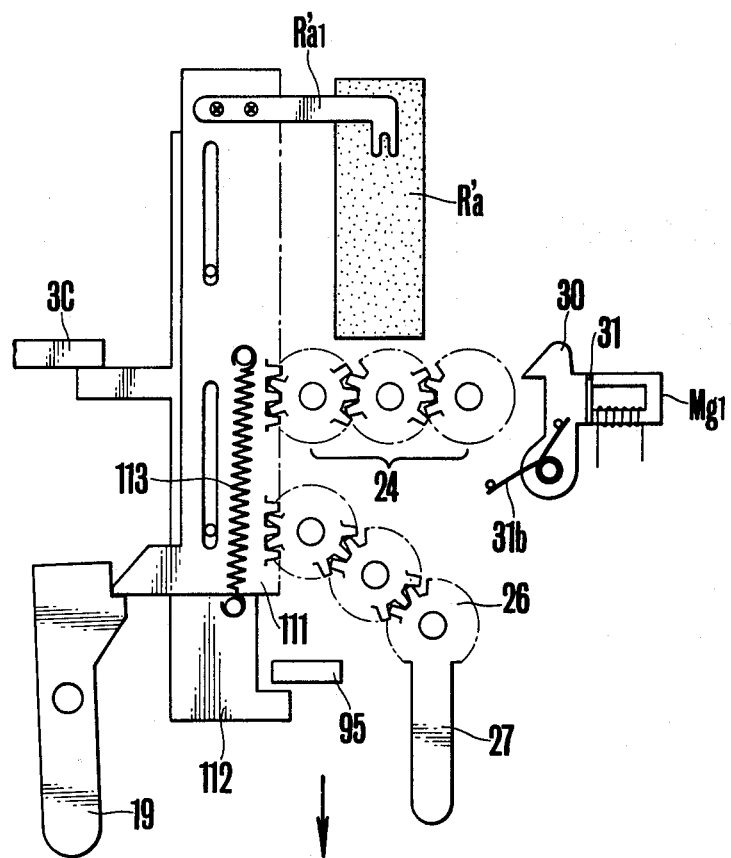
FIG. 4 shows the important members of the third embodiment of the present invention.

FIG. 2 shows the exposure control circuit of the camera shown in FIG. 1, whereby the same members as those in FIG. 1 have the same figures. E is the power source, to which the light measuring circuit 70, the release circuit 71a, the aperture control circuit 71 and the electronic shutter control circuit 72 are connected through the power source switch $S_0$, whereby the aperture display circuit 73 is connected between the light measuring circuit 70 and the aperture control circuit 71. In this release circuit 71a, the delay circuit 86 is connected in series with the switch $S_1$ and the release magnet $Mg_0$. The delay circuit 86 serves to delay the timing for exciting the release magnet $Mg_0$ in such a manner that the shutter is released after the magnet $Mg_1$ has been excited. Thus the delay circuit can be eliminated in case the delay time is produced mechanically. In the light measuring circuit 70, 74 is the amplifier connected to the power source E, whereby, between the first input terminal and the second terminal of the amplifier 74, the light sensing element 51 is connected, while between the first output terminal and the second input terminal of the amplifier 74, the logarithmically compressing diode 75 is connected. Further the output signal of the amplifier 74 is delivered to the first input terminal of the amplifier 76 for carrying out the APEX operation. Further to the second input terminal of the amplifier 76, the shutter time setting signal coming from the shutter time setting circuit 77, the film sensitivity setting signal from the film sensitivity setting circuit 78 and the exposure compensation information signal from the exposure compensation information circuit 79 are delivered. Further, between the second input terminal and the output terminal of the operational amplifier 76, the resistance 80 is connected. The output signal of the amplifier 76 is applied to the meter serving as the aperture display circuit 73. Further, the output signal of the amplifier 76 is delivered to the aperture control circuit 71 and further to the condenser 81 and the first input terminal of the comparator 82 through the switch $S_3$. This comparator 82 is connected to the power source E through the switch $S_1$ including the manual switch $S_4$ and the hold switch $S_2$ connected parallel to each other and the power source switch $S_0$. Further, the second input terminal of the comparator 82 is connected to the connecting point of the constant current circuit 85 with the variable resistance Ra. Further, the output signal of the comparator 82 serves to control the excitation of the magnet $Mg_1$. In the electronic shutter control circuit 72, 83 is the Schmitt circuit connected to the power source E while Rs is the variable resistance whose value varies in accordance with the shutter time setting signal from the shutter time setting circuit 77, whereby this variable resistance Rs is connected in series with the condenser 84 connected parallel with the start switch $S_5$ so as to constitute a time constant circuit. The connecting point of this variable resistance Rs with the condenser 84 is connected to the first input terminal of the Schmitt circuit 83, whose second input terminal is grounded. The output signal of this Schmitt circuit 83 serves to control the shutter control magnet $Mg_2$. Below, the operation of the above composition will be explained. At first the automatic exposure mode photography with priority on the shutter time will be explained. When at first the EE index of the aperture ring 1 is made to coincide with the index 2 as is shown in the drawing, the lever 33 is depressed due to the contact of the cam part 1b with the pin 34a in such a manner that the transmission lever 33 is rotated along the clockwise direction so as to close the manual switch $S_4$. Thus, the clamp lever 32 is further rotated along the counter clockwise direction so as to release the clamping by the lever 30. When then the power source switch $S_0$ is closed, the light measuring circuit 70 is brought into operative state. Namely, the light beam penetrating the photographic lens reaches the light sensing element 51. Consequently the output corresponding to the brightness is delivered from the light sensing element 51 to the first input terminal of the operational amplifier 76 through the amplifier 74 and the log. diode 75. Further to the second input terminal of the operational amplifier 76, the shutter time setting signal from the shutter time setting circuit 77, the film sensitivity setting signal from the film sensitivity setting circuit 78 and the exposure compensating information signal from the exposure compensating information setting circuit 79 are applied. In accordance with these signals the operational amplifier 76 carries out the APEX operation. Then the output signal of the operational amplifier 76 is delivered to the meter 67 of the aperture value display circuit 73, charges the condenser 81 and is applied to the first input terminal of the comparator 82. When then the shutter button 16 is depressed, the switch $S_1$ is closed. Thus the magnet $Mg_1$ is brought into the excited state with the output of the comparator 82 while the magnet $Mg_1$ is brought into the excited state with the output of the Schmitt circuit 83 so as to lock the rear shutter plane gear 43. After the switch $S_1$ has been closed, the release magnet $Mg_0$ is excited after lapse of a certain determined time delayed by the delay circuit 86 so as to attract the iron piece 17c in such a manner that the release lever 17 is rotated along the counter clockwise direction. Thus the lever 20 is rotated along the clockwise direction so as to open the switch $S_3$ in such a manner that the charge voltage of the condenser 81 is stored. By means of the rotation of the lever 20, the engagement of the charge lever 15 with the lever 20 is released so that the charge lever 15 is rotated along the counter clockwise direction so as to withdraw from the position at which the rotation of the lever 30 as well as the lever 27 is prevented. Further along with the rotation of the release lever 17 along the counter clockwise direction, the holding lever 19 is rotated along the counter clockwise direction so as to be disengaged from the sector gear 23. Thus the sector gear is rotated along the clockwise direction by means of the spring 23a and the present ring spring 3a. Thus the gears 24a, 24b and 24c constituting the speed control mechanism 24 are rotated whereby the stop wheel in the last step is rotated along the counter clockwise direction. By means of the rotation of the sector gear 23, the variable resistance Ra and the slide member $Ra_1$ moves slidingly. The variation of the resistance value is detected by means of the comparator 82 until it reaches a certain determined level, when the comparator 82 produces 0 output so as to interrupt the current supply to the magnet $Mg_1$. Thus, the lever 30 is rotated along the counter clockwise direction by means of the spring 31a in such a manner that the bent part is engaged with the stop wheel 24c so as to stop the rotation of the stop wheel 24c. In this way, the position of the sector gear 23 is determined. Further along with the rotation of the sector gear 23, the signal lever 29 is moved downwards through the pin 23c (so that the aperture preset ring 3 whose arm 3c is held by means of the signal lever 29 is rotated along the clockwise direction by means of the spring 3a until it stops. Consequently, when the rotation of the sector gear 23 is stopped, the aperture preset ring 3 has been rotated into the position corresponding to the proper aperture value whereby the position of the bell crank is decided. In other words, the position at which the aperture preset ring 3 stops corresponds to the aperture value determined with the information from the light sensing element 51 for measuring the light coming through the photographic lens, the set shutter time information, the set film sensitivity information and the exposure compensation information. On the other hand, almost parallel to the start of the automatic exposure operation, the automatic aperture mechanism also starts. Namely, along with the excitation of the release magnet $Mg_0$, the release lever 17 is rotated along the counter clockwise direction so as to rotate the engaging lever 18 along the counter clockwise direction by means of the pin 17a. Thus, the lever 11 is also rotated along the clockwise direction so as to rotate the automatic aperture lever 5 along the clockwise direction. Thus, the hold switch $S_2$ is closed while the pin 4 provided on the diaphragm driving ring is operated so as to close the diaphragm in accordance with the position of the present bell crank. Further, along with the rotation of the second automatic aperture lever 7 along the clockwise direction, the mirror driving lever 35 is rotated by means of the spring 35a along the counter-clockwise direction. In consequence, the coaxial pushing up lever 40 rotates the mirror lifting up lever 41 along with the counter clockwise direction so as to lift up the mirror 42. Along with the lifting up operation of the mirror 42, the delay device (not shown in the drawing) starts to operate in such a manner that after the lapse of a certain determined time delayed by the delay device, the front shutter plane lock lever 36 is rotated by means of the mirror driving lever 35 along the clockwise direction. The time delayed by means of the delay device serves to start the shutter after the lapse of the time during which the diaphragm is closed from the smallest aperture value up to the largest aperture value as is shown in FIG. 4. Thus, the front shutter plane gear 37 starts to rotate so as to make the front shutter plane to run through the front shutter plane pinion 38. Along with the start of the front shutter plane, the start switch $S_2$ is opened in a conventional way, whereby after the lapse of the time determined by means of the variable resistance Rs having a value corresponding to the set shutter time and the condenser 84, the Schmitt circuit 83 is opened so as to bring the magnet $Mg_2$ out of the excited state. Thus, the locking of the rear shutter plane gear 43 by means of the lever 44 is released in such a manner that the rear shutter plane gear 43 starts to rotate in order to make the rear shutter plane run through the rear shutter plane pinion 52. Further, when the rear shutter plane has run, along with the rotation of the rear shutter plane gear 43 the rear shutter plane signal lever 45 is rotated by means of the pin 43a along the clockwise direction, so as to rotate the lever along the counter-clockwise direction, closing the switch $S_6$ at the same time. Along with the rotation of the lever 46, the mirror lock lever 39 is pushed down and rotated along the counter-clockwise direction so as to be disengaged from the pushing up lever 40. Thus, the pushing up lever 40 is rotated by means of the spring 40a along the clockwise direction in such a manner that the mirror lifting up lever 41 as well as the mirror 42 resumes the original position by means of the return spring not shown in the drawing. Further along with the rotation of the lever 46, the lever 11 is rotated along the clockwise direction so as to withdraw from the rising up part 5b of the automatic aperture lever 5. The automatic aperture lever 5 is rotated by means of the spring 5a along the counter-clockwise direction whereby the pin 4 provided on the diaphragm driving ring resumes the original position in such a manner that the totally opened state of the diaphragm is restored. When then the winding up shaft 12 carries out the winding up operation, the film is wound up while the shutter is charged, whereby the charge lever 15 is charged by means of the intermediary levers 14 as well as 8 while the automatic aperture mechanism and the mirror mechanism are charged in such a manner that the members disengaged by means of the release operation are engaged with each other again so as to resume the state shown in the drawing.

Further, by depressing the EE lock button 21 the switch $S_3$ is brought into a normally opened state by means of the lever 22 so that the following pictures are taken with the value originally stored in the condenser.

Below, the manual mode photography will be explained. When at first the desired aperture value of the aperture ring 1 is set at the index 2, because the pin 34a is disengaged from the cam part 1b, the lever 33 is rotated along the counter clockwise direction so as to open the manual switch $S_4$, while the clamp lever 32 is rotated along the clockwise direction so as to clamp the lever 30. When then the power source switch $S_0$ is closed, the light measuring circuit 70 is brought into operative state in the same way as in case of priority on shutter time. When then the shutter button 16 is depressed, the switch $S_1$ is closed. Thus, the output of the Schmitt circuit 83 brings the magnet $Mg_2$ into excited state so as to lock the rear shutter plane gear 43. At this time, the switch $S_4$ is opened and the aperture control circuit 71 is not brought into operative state. Further, when the switch $S_1$ is closed, after lapse of a certain determined time delayed by means of the delayed circuit 86, the release magnet $Mg_0$ is brought into excited state so as to attract the iron piece 17c in order to rotate the release lever 17 along the counter clockwise direction. In this way, the lever 20 is rotated along the clockwise direction so as to be disengaged from the charge lever 15 which is rotated along the counter clockwise direction so as to withdraw from the position at which the rotation of the lever 27 is prevented. Further, along with the rotation of the release lever 17 along the counter-clockwise direction, the holding lever 19 is rotated along the counter-clockwise direction so as to be disengaged from the sector gear 23. Thus the sector gear 23 is rotated along the clockwise direction by means of the spring 23a so as to move the signal lever 29 downwards by means of the pin 23c. Consequently, the aperture preset ring 3 holding the arm 3c at the signal lever 29 is rotated by means of the spring 3a into the position of the projection 1a of the aperture ring 1. In this way, the aperture preset ring 3 is rotated into the position of the set aperture value so as to determine the position of the bell crank.

Further along with the rotation of the release lever 19 along the counter-clockwise direction, the automatic aperture mechanism also start. In particular, along with the rotation of the release lever 17, the engaging lever 18 is rotated along the counter clockwise direction so as to close the diaphragm in the same way as in the case of the mode with priority on shutter time and to lift up the mirror 42 in such a manner that the shutter is started. After the shutter has been controlled, the mirror 42 and the automatic aperture lever 5 are returned to the original positions in the same way as in the case with priority on shutter time.

Below, how the depth of focus is confirmed will be explained. When the desired aperture value of the aperture value 1 is set at the index 2 while the diaphragm closing lever 95 for confirming the depth of focus is moved along the direction of the arrow A, the lever 94 is rotated along the clockwise direction so as to move the slide lever 91 downwards against the strength of the spring 93 in such a manner that the aperture preset ring 3 is rotated by means of the spring 3a into the position of the projection 1a of the aperture ring 1. Thus the aperture preset ring 3 is rotated into the position corresponding to the set aperture value so as to determine the position of the bell crank. At the same time, by means of the diaphragm closing lever 95 the automatic aperture lever 5 is rotated along the clockwise direction so as to make the pin 4 provided on the diaphragm driving ring operate in such a manner that the diaphragm is closed down to the position of the preset bell crank. When then the depression of the diaphragm closing lever 95 for confirming the depth of focus along the direction of the arrow A is freed, the slide lever 91 is moved upwards against the strength of the spring 3a by means of the spring 93 so as to resume the original position together with the lever 94 as well as the aperture preset ring. At the same time, the automatic aperture lever 5 is rotated along the counter clockwise direction by means of the spring 5a whereby the pin 4 provided on the diaphragm driving ring resumes the original position so that the totally opened original state is restored.

Figure 3:
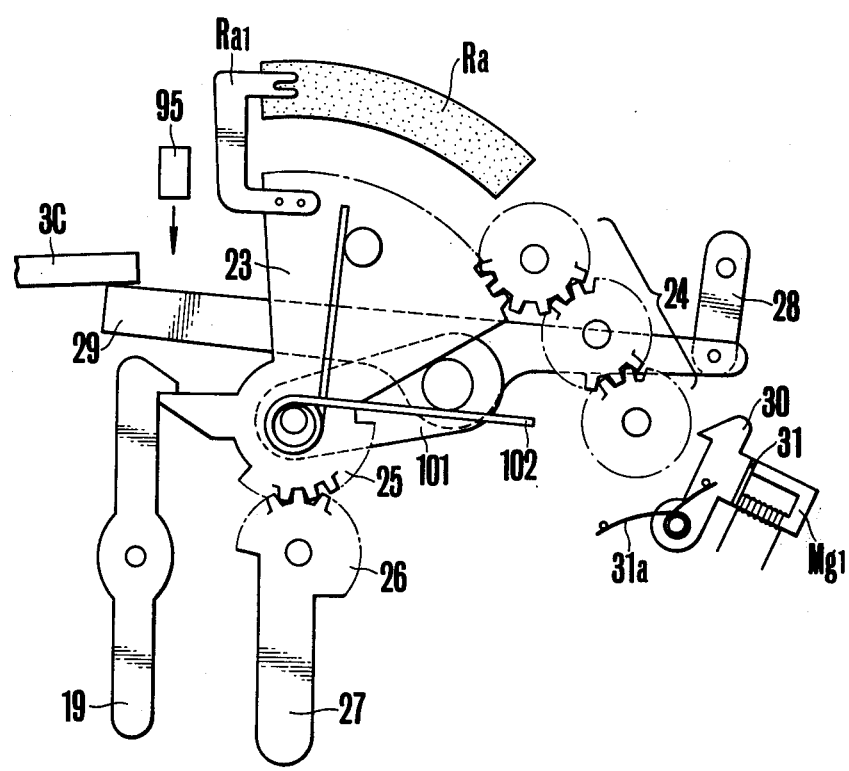
FIG. 3 shows the important members of the second embodiment of the present invention.

FIG. 3 shows the second embodiment of the present embodiment, whereby the same members as those in FIG. 1 have the same explanation. 101 is the serving lever pivoted coaxially with the sector gear 23, whereby between the swing lever 101 and the sector gear 23 the spring 102 is provided while at the end of the swing lever 101 the signal lever 29 engaged with the arm 3c is pivoted. When this signal lever 29 is depressed by means of the diaphragm closing lever 95 for confirming the depth of focus the signal lever 29 is rotated along the counter-clockwise direction against the spring 102 so that the aperture preset ring 3 is rotated into the position of the set aperture value while at the same the automatic aperture lever 5 is rotated so as to close the diaphragm. When then the depression of the diaphragm closing lever 95 for confirming the depth of focus is freed, the strength of the spring 102 is transmitted to the signal lever 29 through the serving lever 101, whereby the signal lever 29 is rotated along the clockwise direction in such a manner that the aperture preset ring 3 resumes the original position while the diaphragm is brought in the totally opened original state.

FIG. 4 shows the third embodiment of the present invention, whereby the same members as those shown in FIG. 1 have the same figures. 111 is the rack corresponding to the sector gear shown in FIG. 1. Between this rack 111 and the arm 3c the serving lever 112 as intermediary member is provided, whereby the arm 3c is held by the projection 112a of the swing lever 112, while between the swing lever 112 and the rack 111 a spring 113 is provided. When this swing lever 112 is depressed by means of the diaphragm closing lever 95 for confirming the depth of focus along the direction of the arrow shown in the drawing, the aperture preset ring 3 is rotated by means of the spring 3a into the position of the set aperture value so as to close the diaphragm. When then the depression of the diaphragm closing lever 95 is freed, the swing lever 111 is moved upwards by means of the force of the spring 113 in such a manner that the aperture preset ring 3 resumes the original position so as to bring the diaphragm into the totally opened initial position.

Figure 5:
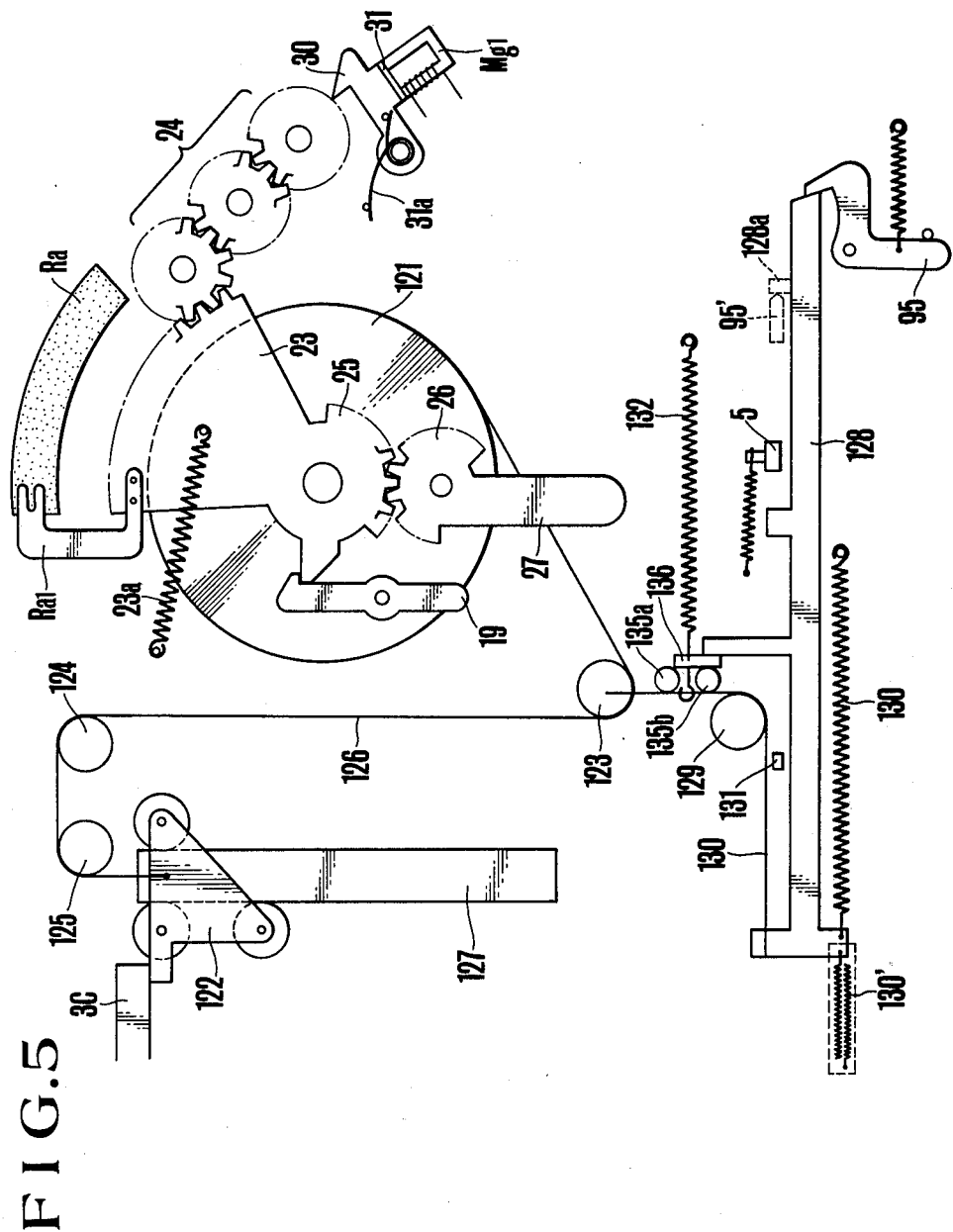
FIG. 5 shows the important members of the fourth embodiment of the present invention.

FIG. 5 shows the fourth embodiment of the present invention, whereby the same members as there in FIG. 1 have the same figures. 121 is the drum secured coaxially with the sector gear 23, whereby between the drum 121 and the roller 122 a wire 126 is provided through the movable pulley 123 and the fixed pulleys 124 and 125. The roller 122 is movable over the fixed member 127, holding the arm 3c. Between the movable pulley 123 and the slide lever 128 a wire 130 is provided through the fixed pulley 129. This slide lever 128 is held by means of the focus depth confirming lever 95, being urged by means of the wire 130. When the focus depth confirming lever 95 is not operated, along with the rotation of the sector gear 23 the drum 121 is rotated in the state shown in the drawing in such a manner that the position of the roller 122 is determined while when the focus depth confirming lever 95 is rotated along the clockwise direction, the slide lever 128 is moved into the position of the stopper 131 by means of the wire 130. Thus, the wire 126 becomes loose, the arm 3c presses the roller 122 downwards by means of the spring 3a of the aperture preset ring 3, the aperture preset ring 3 is rotated into the set aperture value and the diaphragm is closed. When then the slide lever 128 is depressed against the strength of the wire 130, the wire 126 becomes tight and the roller 122 is moved upwards in such a manner that the aperture preset ring 3 resumes the initial position so as to bring the diaphragm into the totally opened initial position. 132 is the spring for preventing the wire 126 from becoming extremely loose at the time of the focus depth confirmation. When the projection 128a of the slide lever 128 is depressed by means of the focus depth confirmation lever 95' as is shown in a dotted line so that the direction of the urging strength of the spring 130' is inversed, the depth of focus can be confirmed when the lever 95' is depressed while the initial state is restored when the depression is freed. 135a and 135b are the rollers fixed on the base plate (not shown in the drawing) whereby on their circumference, a groove is formed so as to control the position of the moving wire 130. 136 is the fixing member of the hook part, provided at the one end of the spring 132 for preventing the wire from becoming loose.

As is explained in detail before, in accordance with the present invention, it is possible to offer a focus depth confirming device for the camera of escaping system, whereby by means of inserting the intermediary member provided with the urging means between the aperture present means, and the aperture adjusting means the next automatic exposure photography can be carried out without any operation after releasing the operation of the focus depth confirming member. This approach is quite effective for making the camera compact.

What is claimed is:

1. A camera having a device for confirming the depth of focus in combination with an interchangeable lens, said combination comprising:
   (1) an interchangeable lens having a diaphragm device which is provided with aperture adjusting means including:
      (a) an aperture ring which is rotatably mounted on an outer ring portion of the interchangeable lens and is provided with aperture value graduations for manual adjustment and an automatic exposure position mark; and
      (b) aperture preset means which engages with the diaphragm device and the aperture ring for presetting the diaphragm device by the aid of a first urging member at a value corresponding to an aperture value graduation at which the aperture ring is set;
   (2) a camera which permits mounting the interchangeable lens thereon including:
      (a) automatic exposure control means provided with computing means for computing an aperture value by receiving information on the brightness of an object to be photographed and information on a setting made for photographing;

(b) automatic exposure aperture control means including an intermediate member which holds said aperture preset means at a predetermined position against an urging force of said first urging member, engaging means interlocked with an intermediate member through a second urging member, which serves to hold said intermediate member at a predetermined position, converting means which produces an electrical signal corresponding to the degree of movement of the engaging means, locking means for locking the engaging means at a predetermined position and stopping means for stopping the movement of the engaging means, said exposure aperture control means being arranged to move said aperture preset means to a position corresponding to the degree of movement of the engaging means;

(c) release means for releasing said locking means in response to a release action of the camera;

(d) electrical control means for producing a control signal on the basis of the signal produced by said computing means and the signal produced by the converting means;

(e) electromagnetic means which is electrically connected to said electrical control means and engages with said stop means for actuating the stop means in response to said control signal in such a manner as to stop the engaging means at a position corresponding to a computation output produced by said computing means; and (f) automatic aperture means provided with actuating means which stops down the diaphragm device to a position where the aperture preset means which is interlocked with said engaging means is movable; and (3) confirming means for combination with said camera and said interchangeable lens, the confirming means being provided with an operation member operable from outside of the camera, said operation member being arranged to move and cause said intermediate member against the urging force of said second urging member from said predetermined position to follow the movement of the aperture preset means and, at the same time, to operate said actuating means to stop a diaphragm device down to a setting value of aperture.

2. The combination according to claim 1, wherein there is provided swaying means which is composed of a swaying member and a charging member and which engages with said aperture preset means and said operation member to perform a swaying action together with said engaging means; the swaying means being allowed to make the swaying action by operation of the operation member so as to make the aperture preset means movable; and the aperture preset means being returned to its preset position by a releasing action of the charging member of the swaying means when the operation member is released from the operation.

3. A camera having a device for confirming the depth of focus in combination with an interchangeable lens, said combination comprising:

(1) an interchangeable lens having a diaphragm device which is provided with aperture adjusting means including:

(a) an aperture ring which is rotatably mounted on an outer ring portion of the interchangeable lens and is provided with aperture value graduations for manual adjustment and an automatic exposure position mark; and (b) aperture preset means which engages with the diaphragm device and the aperture ring for presetting the diaphragm device by the aid of an urging member at a value corresponding to an aperture value graduation at which the aperture ring is set;

(2) a camera which permits mounting the interchangeable lens thereon including:

(a) automatic exposure control means provided with computing means for computing an aperture value by receiving information on the brightness of an object to be photographed and information on a setting made for photographing;

(b) automatic exposure aperture control means including an intermediate member which engages with said aperture preset means, engaging means which is interlocked with the intermediate member to be movable by an urging force of said urging member, converting means which produces an electrical signal corresponding to the degree of movement of the engaging means, locking means for locking the engaging means at a predetermined position and stopping means for stopping the movement of the engaging means, said exposure aperture control means being arranged to move said aperture preset means to a position corresponding to the degree of movement of the engaging means;

(c) release means for releasing said locking means in response to a release action of the camera;

(d) electrical control means for producing a control signal on the basis of the signal produced by said computing means and the signal produced by the converting means;

(e) electromagnetic means which is electrically connected to said electrical control means and engages with said stop means for actuating the stop means in response to said control signal in such a manner as to stop the engaging means at a position corresponding to a computation output produced by said computing means; and (f) automatic aperture means provided with actuating means which stops down the diaphragm device to a position where the aperture preset means which is interlocked with said engaging means is movable; and (3) confirming means for combination with said camera and said interchangeable lens, the confirming means including:

(a) operating means which engages with said aperture preset means and which is provided with a standing block and a running block interlocked with said engaging means to move in response to the movement thereof; and (b) an operation member which engages with said running block of the operating means and is operable from outside of the camera and is provided with a charging member which charges in response to operation of the operation member, said operating means being arranged to be moved by operation of said operation member to make the aperture preset means movable by said urging force and, at the same time, to operate said actuating means to stop down said diaphragm device to a preset aperture value, the aperture preset means being arranged to be returned to a preset position against the urging force when the charging member is released from a charging state by release of the operation member from the operation thereof.

4. A camera which is provided with focus depth confirming means and is controlled by an electromagnet and which permits mounting thereon an interchangeable lens having a diaphragm device and an interlocking member for controlling the diaphragm device in accordance with a signal received from the camera side, said camera including:
(a) light measuring circuit means including computing means which computes an aperture value by receiving information on the brightness of an object to be photographed and information on a setting made for photographing;
(b) automatic exposure aperture control means including an intermediate member which engages with said interlocking member of the interchangeable lens to lock the interlocking member at a preset position, converting means which produces an electrical signal corresponding to the degree of movement of engaging means which is interlocked with said intermediate member to move together with the intermediate member, locking means for locking said engaging means at a predetermined position and stopping means which stops the movement of the engaging means, the automatic exposure aperture control means being arranged to move the aperture preset means to a position corresponding to the degree of movement of said engaging means;
(c) release means including a release member which moves said engaging means from said predetermined position in response to a release operation of the camera;
(d) electrical control means which receives the output of an operational amplifier of said computing means and that of converting means and produces a control signal;
(e) electromagnetic means including a magnet member which is connected to said electrical control means for operation in response to the control signal and stop means which stops the movement of said engaging means in response to the operation of said magnet member;
(f) automatic aperture means including actuating means which engages with the interlocking member of the interchangeable lens and stops down the aperture of the diaphragm device through the interlocking member to adjust it to an aperture value corresponding to the moving degree of said engaging means; and
(g) confirming means for combination with said camera, the confirming means including an operation member which is operable from the outside of the camera and is engageable with said intermediate member and an urging member which is disposed between the intermediate member and said engaging means to store an urging force developed through the movement of the intermediate member, said interlocking member being arranged to follow the intermediate member when the intermediate member is moved by operation of said operation member and to cause said actuating means to stop the aperture of said diaphragm device down to a predetermined position, said interlocking member being caused to return to a predetermined position by the urging force of said urging member when said operation member is released from the operation thereof.

5. A camera according to claim 4, wherein there is provided swaying means which is composed of a swaying member and a charging member and which engages with said aperture preset means and said operating member to perform a swaying action together with said engaging means; the swaying means being allowed to make the swaying action by operation of the operation member to make thereby the aperture preset means movable; and the aperture preset means being returned to its preset position by a releasing action of the charging member of the swaying means when the operation member is released from the operation.

6. A camera which is provided with focus depth confirming means and is controlled by an electromagnet and which permits mounting thereon an interchangeable lens having a diaphragm device and an interlocking member for controlling the diaphragm device in accordance with a signal received from the camera side, said camera comprising:
(a) light measuring circuit means including computing means which computes an aperture value by receiving information on the brightness of an object to be photographed and information on setting made for photographing;
(b) automatic exposure aperture control means including an intermediate member which engages with said interlocking member of the interchangeable lens to lock the interlocking member at a preset position, converting means which produces an electrical signal corresponding to the degree of movement of engaging means which is interlocked with said intermediate member to move together with the intermediate member, locking means for locking said engaging means at a predetermined position and stopping means which stops the movement of the engaging means, the automatic exposure aperture control means being arranged to move the aperture preset means to a position corresponding to the degree of movement of said engaging means;
(c) release means including a release member which moves said engaging means from said predetermined position in response to a release operation of the camera;
(d) electrical control means which receives the output of an operational amplifier of said computing means and that of converting means and produces a control signal;
(e) electromagnetic means including a magnet member which is connected to said electrical control means for operation in response to the control signal and stop means which stops the movement of said engaging means in response to the operation of said magnet member;
(f) automatic aperture means including actuating means which engages with the interlocking member of the interchangeable lens and stops down the aperture of the diaphragm device through the interlocking member to adjust it to an aperture value corresponding to the moving degree of said engaging means; and (g) confirming means suitable for combination with said camera and said interchangeable lens, the confirming means including:
  (i) operating means which engages with said aperture preset means and which is provided with a standing block and a running block interlocked with said engaging means to move in response to the movement thereof; and
  (ii) an operation member which engages with said running block of the operating means and is operable from the outside of the camera and is provided with a charging member which charges in response to operation of the operation member, said operating means being arranged to be moved by operation of said operation member to make the aperture preset means movable by said urging force and, at the same time, to operate said actuating means to stop down said diaphragm device to a preset aperture value, the aperture preset means being arranged to be returned to a preset position against the urging force when the charging member is released from a charging state by release of the operation member from the operation thereof.

* * * * *